United States Patent Office 3,329,610
Patented July 4, 1967

3,329,610
BACTERICIDES FOR USE IN SECONDARY OIL RECOVERY
Donald F. Kreuz, Princeton Junction, and William H. Kibbel, Jr., Pennington, N.J., assignors to FMC Corporation, a corporation of Delaware
No Drawing. Continuation of application Ser. No. 113,120, May 29, 1961. This application Nov. 16, 1965, Ser. No. 508,146
9 Claims. (Cl. 252—8.55)

This application is a continuation of U.S. application Ser. No. 113,120, filed May 29, 1961, now abandoned, in the names of Donald F. Kreuz and William H. Kibbel, Jr.

This invention relates to a method for preventing growth of bacteria present in water used for "secondary oil recovery."

Oil which remains in underground porous rock formations cannot be recovered by conventional oil pumping methods. In order to recover this residual oil, workers in this field have resorted to "secondary oil recovery" techniques. One well known "secondary oil recovery" process consists of forcing flood waters down one or more wells into the porous earth formation at high pressure. The water displaces the oil from the pores of the earth formation, and the oil is recovered at other wells located some distance from the side of the water injection well.

The commercial utilization of this technique has given rise to a most serious problem, which arises from the growth of aerobic and anaerobic bacteria in the injection water system. The bacteria multiply in such large numbers that they cause corrosion of the metal equipment, and in unchecked quantities they are capable of plugging the pores of the oil-bearing earth formation. Two prominent classes of troublesome bacteria which are encountered are *Desulfovibrio desulfuricans* (sulfate reducers), an anaerobe, and Pseudomonas, an aerobe. The sulfate reducers cause corrosion of the metal equipment, while both Pseudomonas and sulfate reducers cause plugging of the oil-bearing pores.

In an effort to kill these microorganisms various bactericides have been employed including quaternary ammonium compounds, formaldehyde, chlorinated phenols, hypochlorites, and chlorine. These bactericides have not been found completely suitable in this application for many reasons. For example, many of the bactericides are not compatible with other required chemical additives, e.g., corrosion inhibitors; others remain as residues in flood waters in sufficient concentrations to make the water toxic; others exhibit high corrosion on metallic equipment. However, one of the principal objections to most of these bactericides is that they permit the development of resistant strains of microorganisms. When this occurs, the effectiveness of the bactericide diminishes with continuing use, until finally it loses its effective bacteria-killing power.

It is an object of the present invention to prevent the growth of harmful bacteria in flood waters used in secondary oil recovery, by application to them of a bactericide which does not permit resistant strains of these bacteria to develop.

It is another object of the present invention to prevent the growth of harmful bacteria in flood waters used in secondary oil recovery, with a bactericide which is compatible with corrosion inhibitors employed in the flood waters.

It is another object of the present invention to prevent the growth of harmful bacteria in flood waters used in secondary oil recovery, with a bactericide which does not render the treated flood waters toxic.

It is a further object of the present invention to prevent the growth of harmful bacteria in flood waters used in secondary oil recovery, with a bactericide which is effective at very low concentrations and over a wide pH range.

These and other objects will be apparent from the following description of the invention.

It has now been determined unexpectedly that peracetic acid, when used in concentrations as low as about 0.4 p.p.m. is an effective bactericide against deleterious microorganisms found in flood waters when these flood waters are employed in recovering oil by displacing the oil from porous underground earth formations and that this bactericide does not permit resistant strains of these deleterious microorganisms to develop.

In the present process, peracetic acid is added to the flood waters before they are injected into the well. This is done either by continuous addition of the peracetic acid, or by intermittent injection at periodic intervals—"slugging." The point of addition of the peracetic acid is not critical, except that it preferably should contact the water for about 120 seconds or more before being piped into the water injection well to displace the oil. This contact time assures an effective kill of the microorganisms, including both aerobes and anaerobes, even though the bactericide is believed to act instantaneously on the microorganisms. In the preferred embodiment of this invention, the peracetic acid is added directly into the water stream at a point some distance from the water injection well, and the required contact time elapses during the flow of water to the injection well site.

The peracetic acid should be present in the flood waters at concentrations of at least about 0.4 p.p.m. if an 80% kill is to be obtained for all organisms. Larger amounts, i.e., 0.8 p.p.m. or higher may be employed if a 97% kill of all microorganisms must be obtained. Even higher kills can be obtained with up to 2.8 p.p.m. of peracetic acid. The use of larger amounts of peracetic acid than 2.8 p.p.m., does not increase the percent of kill, but is useful as a safety factor to assure that all of the flood waters contain the minimum required amount of bactericide, in cases where uniform mixing is difficult to achieve. The maximum useable amount is generally dictated by economic considerations, and is about 200 p.p.m.; a more commercially acceptable figure is about 100 p.p.m. The activity of peracetic acid, in terms of its killing ability per unit of bactericide, is outstanding. Other commercially employed bactericides can obtain 99.9% kills of all microorganisms only when used in minimum concentrations of about 20 to 30 p.p.m., while peracetic acid requires only 1.2 p.p.m. to effect comparable kills.

The instant bactericide is effective at temperatures of about 0° C. to as high as 60° C. Generally the temperatures of the flood waters will vary between about 5° C. to about 35° C.; this, therefore, constitutes the preferred temperature at which the peracetic acid is employed.

The peracetic acid is effective over a pH range of about 3 to 12, but its bactericidal action is greatest at a pH of about 5 to 9. Higher or lower pH conditions tend to kill the microorganisms naturally, so that bactericides are not necessary. Since operation at a pH outside the above range is not encountered in the field, and the water is in the pH range where microorganisms can multiply, bactericides are generally required. The effectiveness of peracetic acid under the wide range of pH conditions found in the field is most advantageous, since various commercial bactericides operate only within narrow pH ranges. For example, most quaternary ammonium compounds operate best only under alkaline conditions, at a pH of about 10. Another typical bactericide, Rosin Amine D Acetate, is not compatible with caustic solutions and cannot be used in flood waters under alkaline conditions. Additionally, the activity of still another class of bactericides, chlorinated phenols, changes readily with minor shifts in pH. In contrast, peracetic acid can be employed regardless of the acidity or basicity of the naturally occurring flood waters.

The following examples are included by way of illustration of the present invention and are not to be deemed limitative thereof.

EXAMPLE 1

*Killing power of peracetic acid*

The bactericidal activity of the peracetic acid was determined by means of a time kill test. The test was conducted as follows:

Test solutions containing varying concentrations of peracetic acid, as set forth in Table I, were made up using distilled water. The pH's of these test solutions were adjusted to 7.0. All equipment and solution were sterile. One hundred ml. samples of the test solutions of peracetic acid were placed in flasks, and maintained at 20° C. throughout the test. Controls containing only distilled water were similarly prepared.

Cultures of *Desulfovibrio desulfuricans* (ATC No. 7751) were prepared by transferring a loopful of the cultured organisms to a broth (pH 7.0) containing:

| | |
|---|---|
| Glucose _____gms__ | 10 |
| $MgSO_4$ _____gms__ | 1.5 |
| $Na_2SO_4$ _____gms__ | 1.5 |
| Peptone _____gms__ | 5.0 |
| Yeast extract _____gms__ | 4.0 |
| $Fe(NH_4)_2(SO_4)_2$ _____gms__ | 0.01 |
| Sodium thioglycolate _____gms__ | 0.1 |
| Distilled water _____ml__ | 1000 |

The broth was incubated for 5 days at 30° C. Thereafter, 10 ml. of this broth was added to 99 ml. of distilled water to make up a stock dilution of this anaerobe.

One milliliter of the stock dilution was added to each of the prepared flasks containing the peracetic acid solutions, and also to the controls. The test solutions and controls were shaken and held for 30 minutes at 20° C. At the end of this period aliquots of 1 ml., 1/10 ml., 1/100 ml., 1/1000 ml., and 1/10000 ml. of the test solutions and controls were each transferred and plated out in test tubes using about 10 ml. of the medium given below. The medium was overlaid with approximately ½ inch of heavy mineral oil to cut down access of oxygen. The medium had a pH of 7.0 and was composed of the following ingredients in the indicated amounts:

| | |
|---|---|
| Glucose _____gms__ | 10 |
| $MgSO_4$ _____gms__ | 1.5 |
| $NaSO_4$ _____gms__ | 1.5 |
| Peptone _____gms__ | 5.0 |
| Yeast extract _____gms__ | 4.0 |
| $Fe(NH_4)_2(SO_4)_2$ _____gms__ | 0.01 |
| Sodium thioglycolate _____gms__ | 0.1 |
| Distilled water _____ml__ | 1000 |
| Agar _____gms__ | 17.5 |

The number of organisms in the tubes were counted after one month's incubation at room temperature. Tubes containing a countable number of colonies were used to determine an accurate count, and this figure when corrected for the dilution factor, gave the number of organisms per milliliter of test solution. These figures are reported in Table I.

In a similar manner varying concentrations of peracetic acid test solutions as set forth in Table I, were made up to test the bactericidal activity of peracetic acid on Pseudomonas. Cultures of a species of the aerobe, Pseudomonas, were isolated from typical flood waters. Cultures were prepared by transferring a loopful of the cultured organisms to a broth (pH 7.2) containing:

| | |
|---|---|
| Peptone _____gms__ | 10 |
| $K_2HPO_4$ _____gm__ | 0.5 |
| $MgSO_4$ _____gm__ | 0.2 |
| NaCl _____gm__ | 0.1 |
| $FePO_4$ _____ | Trace |
| Agar _____gms__ | 17.5 |
| Distilled water _____ml__ | 1000 |

The broth was incubated for 24 hours at 30° C. Thereafter two ml. of this broth was added to 99 ml. of distilled water to make up a stock dilution of the aerobe.

One milliliter of stock dilution was added to each of the prepared flasks containing test solutions of peracetic acid, and to the controls. The test solutions and controls were shaken and held for 30 minutes at 20° C. At the end of this period, aliquots were plated out in petri dishes in the manner previously described. The medium employed in the petri dishes had a pH of 7.2 and contained the following ingredients in the indicated amounts:

| | |
|---|---|
| Peptone _____gms__ | 10 |
| $K_2HPO_4$ _____gm__ | 0.5 |
| $MgSO_4$ _____gm__ | 0.2 |
| NaCl _____gm__ | 0.1 |
| $FePO_4$ _____ | Trace |
| Agar _____gms__ | 17.5 |
| Distilled water _____ml__ | 1000 |

The number of organisms in the petri dishes were counted after one week's incubation at room temperature, in the manner previously described, and are reported in Table I.

TABLE I

| Peracetic Acid Test Solutions, p.p.m. | *Desulfovibrio desulfuricans* | | Pseudomonas | |
|---|---|---|---|---|
| | Orig./ml. | Percent Kill | Orig./ml. | Percent Kill |
| 0 (Control) | 42,000 | | 16,500 | |
| 0.4 | 100 | 99.8 | 3,350 | 79.7 |
| 0.8 | 0 | 100.0 | 500 | 97.0 |
| 1.2 | 0 | 100.0 | 12 | 99.9 |
| 1.6 | 0 | 100.0 | 1 | 99.9 |
| 2.0 | 0 | 100.0 | 5 | 99.9 |
| 2.4 | 0 | 100.0 | 2 | 99.9 |
| 2.8 | 0 | 100.0 | 0 | 100.0 |
| 3.2 | 0 | 100.0 | 0 | 100.0 |
| 3.6 | 0 | 100.0 | 0 | 100.0 |
| 4.0 | 0 | 100.0 | 0 | 100.0 |

EXAMPLE 2

*Development of resistant strains*

The growth of strains of Pseudomonas resistant to peracetic acid was attempted by the following procedure. A culture of Pseudomonas, identical to that used in Example 1, was prepared in a broth in the same manner as described in Example 1, and incubated for 24 hours at 30° C. Two ml. of this culture were inoculated into 98 ml. of distilled water to give a stock dilution. One ml. of the stock dilution was used to inoculate 100 ml. of the most dilute peracetic acid test solutions. The test solutions contained peracetic acid in concentrations of 0.4 p.p.m. to 4.4 p.p.m. in increments of 0.4 p.p.m After being held at 20° C. for 30 minutes, 1 ml. of the inoculated peracetic acid test solution was transferred into each of 6 tubes containing 9 ml. of the Pseudomonas broth medium described in Example 1. The broths were held at 30° C. until growth appeared.

One of the resulting 6 cultures was then used to inoculate the next test solution containing a higher concentration of peracetic acid, in the manner set for above. This procedure was continued until no growth occurred. In carrying out this procedure, 6 inoculations were made from each cultured broth, to assure obtaining any living organisms which survived the bactericidal effect of peracetic acid and which could be used for inoculating the test solutions containing the next higher concentration of peracetic acid. Control samples containing only distilled water were inoculated with the same culture, and identical broth mixtures were used to culture the microorganisms in the same manner as the test samples containing peracetic acid.

It was noted that all of the series of 6 inoculated test solutions showed some growth of microorganisms at concentrations up to 1.6 p.p.m. of peracetic acid. However, at 2.1 p.p.m. peracetic acid, more than half of the inoculated solutions showed no sign of living microorganisms. The (surviving) living organisms at this concentration of peracid were used to inoculate the higher concentration peracetic acid test solutions. The microorganisms were able to survive at 3.6 p.p.m. of peracetic acid, but at 4.0 p.p.m. no further growth could be obtained. The control samples exhibited growth in all of the samples, throughout the test procedure.

Since the results of Example 1 indicate that a 100% kill of the non-conditioned Pseudomonas occurs at about 2.8 p.p.m. of peracetic acid, and since the present example shows that 100% kill of the conditioned Pseudomonas occurs at 4.0 p.p.m., it is believed that these results clearly demonstrate that no resistant strain of Pseudomonas was developed.

The above procedure was duplicated with *Desulfovibrio desulfuricans* using the identical broth and technique employed in Example 1 for growing these anaerobes. The results obtained were the same as with the Pseudomonas with no resistant strains appearing, except that the concentration of peracetic acid required to produce a 100% kill of the conditioned and unconditioned *Desulfovibrio desulfuricans* was lower than with Pseudomonas.

EXAMPLE 3

*Continuous addition*

A water injection system consisting of two 10-foot head tanks from which water flows through a filter to a single, high pressure, piston pump was used to deliver water through a pipe line network to water injection wells. The injection wells were arranged in a conventional 5-spot flood pattern, with a center well being the producer well. The pH of the water used averaged about 6.4, and its temperature was between 9° C. and 12° C., during the test. The water was treated with a standard corrosion inhibitor throughout the test period. The corrosion inhibitor is composed of 60% of a coco fatty acid alkylolamide, 30% of an anionic amine sulfonate, and 10% of a mixture of glycerine and diethanolamine sulfate. After several days peracetic acid, in the form of 40% peracetic acid solution, was added to the water in amounts of 8.9 p.p.m. The 40% peracetic acid was metered in on the suction side of the high pressure water pump by means of a proportioning chemical feeder. The corrosion inhibitor was metered in by means of a proportioning pump at a point several feet upstream of the peracetic acid addition plant. The 40% peracetic acid was added continuously at a rate of about 3.4 oz./hour into the flood waters, which were being injected at a rate of about 9.544 lbs./hour (654 bbl./day). Microbiological analyses of the water were taken from the head of a well 475 feet from the pumping station, and are reported in Table II.

TABLE II

| No. of Days | Procedure | Total Aerobes | Percent Kill | Total Anaerobes | Percent Kill |
|---|---|---|---|---|---|
| 1 | Untreated water | 3,650 | | 12 | |
| 2 | 10 p.p.m.-corrosion inhibitor added continuously. | | | | |
| 15 | do | 500,000 | | 200 | |
| 29 | do | 600,000 | | 100 | |
| 43 | do | 500,000 | | 200 | |
| 59 | do | 400,000 | | 20 | |
| 63 | Corrosion inhibitor addition increased to 15 p.p.m., continuous addition. | | | | |
| 73 | 15 p.p.m.-corrosion inhibitor added continuously. | 186,000 | | 50 | |
| 86 | do | 86,000 | | 10 | |
| 100 | do | 107,000 | | 100 | |
| 110 | 8.9 p.p.m. peracetic acid continuously added in addition to 15 p.p.m. of corrosion inhibitor. | | | | |
| 118 | do | 2 | 99+ | 1 | 99 |
| 124 | do | 29 | 99+ | 2 | 99 |

EXAMPLE 4

*"Slugging" addition*

The water injection system of Example 3 was employed for testing the bactericidal effect of peracetic acid by the "slugging" technique. The flood waters used for well injection had a pH of about 6.4, and a temperature between 9° C. and 12° C. The water was treated throughout the test period with the same corrosion inhibitor employed in Example 3. Peracetic acid was added to the flood waters continuously for 24 hours in amounts to provide 49 p.p.m. in the flood waters being treated as indicated in Table III. The peracetic acid was introduced into the flood waters during this 24-hour "slugging" period by adding 1.46 lbs./hour of the peracetic acid solution to flood waters which were being injected at a rate of 12,011 lbs./hour (822 bbl./day). After 13 days, the injected flood waters were again "slugged" continuously for 24 hours with 45 p.p.m. of peracetic acid. The peracetic acid was introduced in the form of 40% peracetic acid solution in the amount of 1.51 lbs./hour to the flood waters which were being injected at a rate of 13,410 lbs./hour (918 bbl./day). The bactericidal count is reported in Table III.

TABLE III

| No. of Days | Procedure | Total Aerobes | Percent Kill | Total Anaerobes | Percent Kill |
|---|---|---|---|---|---|
| 1 | Untreated water | 3,650 | | 12 | |
| 2 | 15 p.p.m. of corrosion inhibitor added continuously. | | | | |
| 3 | ___do___ | 550,000 | | 100 | |
| 16 | Added 49 p.p.m. of peracetic acid for 24 hours, in addition to corrosion inhibitor. | | | | |
| 17 | 15 p.p.m. of corrosion inhibitor added continuously. | 1 | 99+ | 0 | 100 |
| 30 | ___do___ | 280,000 | | 1,000 | |
|  | Added 45 p.p.m. of peracetic acid for 24 hours after above count was taken. | | | | |
| 31 | 15 p.p.m. of corrosion inhibitor added continuously. | 1 | 99+ | 0 | 100 |

As can be seen from Example 2 resistant strains of microorganisms are not developed with continued use of peracetic acid as a bactericide. This is of extreme importance since most of the prior bactericides such as quaternary ammonium compounds, formaldehyde, and chlorinated phenols, do permit formation of resistant strains.

Another important advantage of peracetic acid which is illustrated in Example 3, is the compatibility of this bactericide with corrosion inhibitors employed in the flood waters. Corrosion inhibitors are mandatory in certain flood waters used for secondary oil recovery, because of the corrosive effect of the water on the metal equipment. As a result, one of the requirements for a workable bactericide is that it be compatible with the corrosion inhibitor. This problem is further complicated because some of the preferred commercially desirable corrosion inhibitors serve as nutrients for the microorganisms; that is, the microorganisms actually feed on the corrosion inhibitor and multiply at a prodigious rate when they are in contact with the inhibitor. This is shown in Example 3 by the rapid growth of microorganisms after the addition of the corrosion inhibitor but before the addition of the peracetic acid. This places an additional burden on the bactericide in that it must have a high percent of kill in the presence of the corrosion inhibitor. Peracetic acid satisfies this requirement, without reservation.

The present bactericide has as additional advantage over bactericides in that the spent residue is nontoxic. After its bactericidal property has been spent, peracetic acid decomposes and yields as its residue, the innocuous substance acetic acid and water. Further at the low concentrations at which it is employed, not even an acetic acid taste is discernible in the flood waters. This is important because in many areas, flood waters are utilized for drinking purposes by humans as well as animals. Toxic remains, in such instances, would make the water unfit for consumption. This factor has led to the avoidance of many bactericides such as mercurials, formaldehyde, and the chlorinated phenols, all of which leave toxic residues.

Another advantage of the present bactericide is that it is not corrosive, to any substantial extent, as are other commercial bactericides, notably chlorine and hypochlorites. This relieves the burden on the added corrosion inhibitor of preventing corrosion incurred by the bactericide as well as by the water. Additionally, the extreme solubility of peracetic acid under all pH conditions and the lack of high volatility, simplifies the addition of the bactericide and makes it ideal for wide operation conditions.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of secondary oil recovery wherein water is injected into a water injection well under high pressures and wherein oil is displaced by said water from the pores of underground earth formations and recovered from a second well some distance removed from the site of said water injection well, the improvement which comprises maintaining peracetic acid as a bactericide in said water in concentration of at least 2.8 p.p.m. when bacteria in said water have not been previously conditioned to peracetic acid, and in concentrations of at least 4.0 p.p.m. when bacteria in said water have been conditioned to peracetic acid, prior to using said water to displace said oil from said underground earth formations.

2. Process of claim 1 wherein the concentration of the peracetic acid in said water is between 2.8 and 200 p.p.m.

3. Process of claim 1 wherein the concentration of the peracetic acid in said water is between 2.8 and 100 p.p.m.

4. Process of claim 1 wherein the temperature of said water is between 5° and 35° C.

5. In the process of secondary oil recovery, wherein water is injected into a water injection well under high pressures and wherein oil is displaced by said water from the pores of underground earth formations and recovered from a second well some distance removed from the site of said water injection well, the improvement which comprises introducing peracetic acid as a bactericide into said water in concentrations of at least 4.0 p.p.m. before using said water to displace said oil from said underground earth formations.

6. Process of claim 5 wherein the concentration of the peracetic acid in said water is between 4.0 and 200 p.p.m.

7. Process of claim 5 wherein the concentration of the peracetic acid in said water is between 4.0 and 100 p.p.m.

8. Process of claim 5 wherein the concentration of the peracetic acid is at least about 9 p.p.m.

9. Process of claim 5 wherein the temperature of said water is between 5° and 35° C.

(References on following page)

References Cited

UNITED STATES PATENTS

| | | | |
|---|---|---|---|
| 2,590,856 | 4/1952 | Greenspan et al. | 167—22 |
| 2,692,231 | 10/1954 | Stayner et al. | 252—8.55 |
| 2,839,467 | 6/1958 | Hutchison et al. | 252—8.55 |
| 2,917,428 | 12/1959 | Hitzman | 252—8.55 |

LEON D. ROSDOL, *Primary Examiner.*

ALBERT T. MEYERS, *Examiner.*

H. B. GUYNN, *Assistant Examiner.*

UNITED STATES PATENT OFFICE
CERTIFICATE OF CORRECTION

Patent No. 3,329,610                                July 4, 1967

Donald F. Kreuz et al.

It is hereby certified that error appears in the above numbered patent requiring correction and that the said Letters Patent should read as corrected below.

Column 4, line 66, for "for" read -- forth --; column 6, line 16, for "9.544" read -- 9,544 --; column 7, line 52, after "over" insert -- other --.

Signed and sealed this 24th day of September 1968.

(SEAL)

Attest:

Edward M. Fletcher, Jr.

Attesting Officer

EDWARD J. BRENNER

Commissioner of Patents